(12) United States Patent (10) Patent No.: US 9,018,896 B2
Fischbach et al. (45) Date of Patent: Apr. 28, 2015

(54) METHOD AND SYSTEM FOR DETERMINING WHETHER A PORTABLE DEVICE IS CHARGING

(75) Inventors: Christopher Fischbach, Tucson, AZ (US); Timothy J. Knowlton, Benson, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 979 days.

(21) Appl. No.: 13/149,529

(22) Filed: May 31, 2011

(65) Prior Publication Data

US 2012/0306455 A1 Dec. 6, 2012

(51) Int. Cl.
*H02J 7/00* (2006.01)
*H02J 7/04* (2006.01)

(52) U.S. Cl.
CPC ....... *H02J 7/0052* (2013.01); *H02J 2007/0001* (2013.01); *H02J 2007/0062* (2013.01)

(58) Field of Classification Search
CPC ........................................................ Y02E 60/12
USPC ........................................................... 320/107
See application file for complete search history.

(56) References Cited

U.S. PATENT DOCUMENTS

| 2007/0143505 A1* | 6/2007 | Terrell, II ........................ 710/10 |
| 2010/0205463 A1* | 8/2010 | Magnusson ................... 713/300 |
| 2010/0219790 A1* | 9/2010 | Chadbourne et al. ......... 320/107 |

* cited by examiner

*Primary Examiner* — Edward Tso
*Assistant Examiner* — Ahmed Omar
(74) *Attorney, Agent, or Firm* — King & Spalding L.L.P.

(57) ABSTRACT

A method and system for detecting a charging current supplied to a portable device through a USB charger. The method includes the steps of connecting a charging circuit to a portable device, allowing the portable device to draw charging current from the charging circuit, measuring the current drawn from the charging circuit, comparing the measured current with a threshold value, making one or more system level decisions regarding charging of the portable device if the detected charging current is below the threshold current.

20 Claims, 3 Drawing Sheets

METHOD AND SYSTEM FOR DETERMINING WHETHER A PORTABLE DEVICE IS CHARGING

TECHNICAL FIELD

The present disclosure relates to portable devices and more particularly to methods and systems for charging portable devices through Universal Serial Bus (USB) ports.

BACKGROUND

Portable electronic devices such as MP3 players, cameras, and cell phones are typically fitted with a USB port, which allows them to transfer data to or from other controllers or hosts. Using these USB ports, portable devices may charge their batteries by conveniently drawing current from personal computers or other devices containing a USB port. In light of this convenience, engineers have developed standalone or dedicated USB chargers that provide a USB receptacle, allowing portable devices to charge either from a computer or a dedicated USB charger.

The advent of dedicated USB chargers has, however, increased charging complexity. Now, different types of USB charging ports are available, such as standard downstream ports, dedicated charging ports, and other such ports. Moreover, these ports allow portable devices to draw charge at different rates. Because these charging ports have different electrical characteristics, portable devices must identify the port type before they can begin drawing current. If the port is not correctly identified or not identified at all, a portable device may not be able to draw sufficient current from the port. Ascertaining the port type, however, can often become difficult.

To overcome this difficulty, the USB Battery Charging Working Group has introduced a Battery Charging Specification (BCS), which describes a charging port detection handshake profile, allowing BCS-compatible devices to detect the USB port type before drawing current. Though this profile allows compatible devices to charge, it introduces a problem for non-BCS compliant legacy devices.

Legacy products do not follow the BCS protocol; therefore, when these devices are connected to USB charger, they may not be able to properly detect the port type. Moreover, because legacy devices cannot identify the port type, they may be allowed to draw minimal current (80-100 mA) from the charging port or no current at all.

Moreover, smart charging ports (available today) support a large number of portable devices. These ports sometimes provide different handshaking protocols to downstream devices to initiate charging. Once a handshake is complete, the charging port provides current according to the successful handshake protocol's charging parameters. Some challenges exist, however, with this charging scheme. For example, if the portable device identifies the port as a standard downstream port, the handshake would be complete; but, the portable device may not be able to draw any current or may draw minimum current, which is not sufficient to charge the device efficiently. Moreover, when a legacy device connects to a BCS compatible port, the device cannot ascertain whether it is drawing the optimum amount of current.

Therefore, there remains a long-felt but unresolved need for a system or method for detecting charging current drawn by a downstream portable device during device charging or determining whether a portable device is charging.

SUMMARY

Briefly described, and according to one embodiment, the present disclosure describes a system and method for detecting charging current and using the current drawn by a portable device. The system includes a charging circuit having a power switch and a current detector connected to the power switch for detecting the charging current. The charging circuit further includes a comparator connected to the current detector for comparing the detected charging current with a threshold current. Moreover, the charging circuit makes one or more system level decisions if the detected charging current is below the threshold current.

According to another embodiment, the present disclosure describes a battery charging system for measuring charging current supplied to a portable device. The system includes a power supply, and a power switch connecting the power supply to the portable device. The system further includes a current sensing module connected to the power switch for detecting the charging current drawn from the power supply, and a current threshold database for storing one or more threshold current values. In addition, the system includes a comparator connected to the current sensing module for comparing the detected charging current with a corresponding threshold current value. The system may further include a profile database for storing one or more handshake profiles, and an emulation circuit for applying a handshake profile to connect the portable device as well as for exiting the handshake profile if the detected charging current is lower than the threshold current value.

Figure 1:
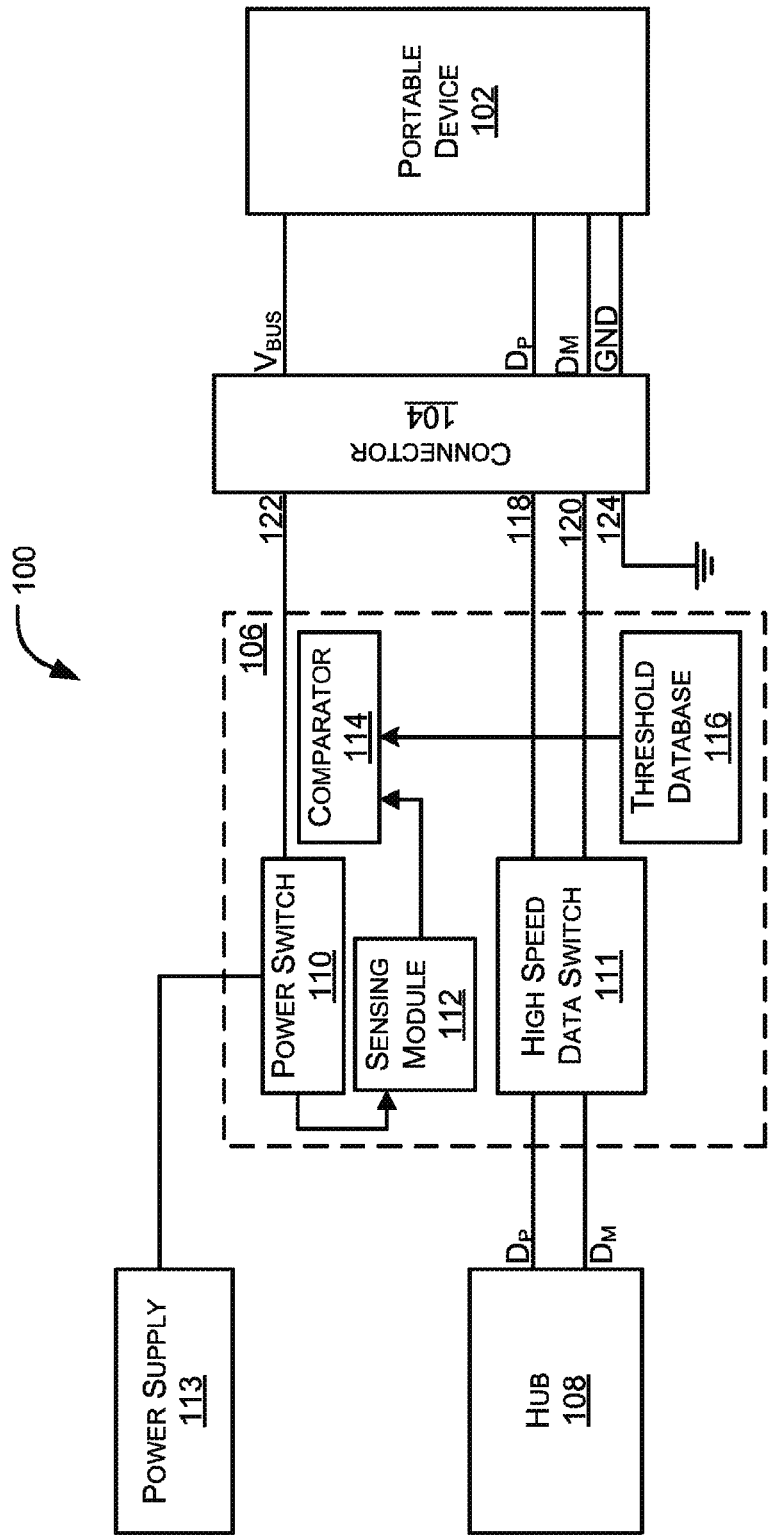
FIG. 1 illustrates an exemplary battery charging system according to embodiments of the present disclosure.

While embodiments of the present disclosure are amenable to various modifications and alternative forms, specific embodiments are shown by way of example in the drawings and are described in detail. It should be understood, however, that the drawings and detailed description thereto are not intended to limit the present disclosure to the particular form disclosed, but on the contrary, the intention is to cover all modifications, equivalents, and alternatives falling within the spirit and scope of the present disclosure as defined by the appended claims.

DETAILED DESCRIPTION

Overview

The following terms are used throughout this document and are defined here for clarity and convenience.

Attach refers to a physical electrical connection between a downstream device and an upstream port.

Connection refers to the state in which a downstream device is attached to an upstream port and the downstream device has pulled either $D_P$ (Data Plus) or $D_M$ (Data Minus) signals high through a resistor, in order to enter signaling.

Disconnect refers to the loss of active USB communication between a USB host and a USB device.

Standard Downstream Port is a downstream port on a host or a hub. The port expects that a downstream device will draw less than 2.5 mA when unconnected, up to 100 mA when connected, and up to 500 mA if so configured and not suspended.

Charging Downstream Port (CDP) is a downstream port on a device that complies with the USB 2.0 definition of a host or a hub, except that a downstream device is permitted to draw in excess of 500 mA up to $I_{DCHG}$ while simultaneously communicating with a host device.

Dedicated Charging Port (DCP) refers to a downstream port on a device that outputs power through a USB connector, but is not capable of enumerating a downstream device. A dedicated charging port is required to allow a downstream device to draw at a minimum current of $I_{DCHG}$ at an average voltage of $V_{CHG}$.

DCD (Device Connection Detection) refers to an action taken by downstream devices, when $V_{BUS}$ is applied, to determine when the $D_P$ and $D_M$ pins are connected to a USB host.

Legacy Device may be a USB device that requires application of non-BCS signatures on the $D_P$ and $D_M$ pins to enable charging.

Downstream Device is a USB device connected on the $D_P$ and $D_M$ pins of a host device and that acts as a slave to the host device.

Charger Emulation Profile refers to the reactive handshake applied on the $D_P$ and $D_M$ pins to emulate a specific charger type such as a BCS CDP or a legacy dedicated charger device.

USB Charger includes a device with a dedicated charging port, such as a wall adapter or a car power adapter.

Portable Device refers to any USB or on-the-go (OTG) device that is capable of operating from its own battery and is also capable of drawing current from its USB port for the purpose of operating and/or charging its battery.

When a portable device is attached to a charging device, such as a USB port it first identifies the port type before drawing charging current (if the device's batteries are not fully charged). The amount of current a portable device draws from a USB port depends on the USB port type and the ability of the portable device to identify the port type. For example, if a portable device identifies a USB port as a Dedicated Charging Port or a charging downstream port, the portable device may draw up to 1.8 A current from the port. Alternatively, if the portable device identifies the USB port as a standard downstream port, it may draw up to 100 mA from the port. Moreover, if a portable device is unable to identify the port type, it may draw up to 100 mA from the port, even though the port may be a dedicated charging port. This current level may be enough current to sufficiently charge a portable device; the amount of time required to fully charge the batteries of a portable device at this rate, however, may be very long.

As described previously, a number of different standards and protocols (or profiles) are utilized by portable devices to identify the USB port type and begin charging efficiently. For example, some devices comply with the Battery Charging Specification (BCS 1.1), while legacy devices such as RIM® and Apple® devices utilize their own charging protocols. RIM® devices, for instance, require installation of certain drivers on the host or hub for the devices to recognize the USB port.

Moreover, certain chargers include multiple handshake protocols for charging various types of portable devices. Chargers of this kind cycle through multiple handshake profiles until a handshake is successfully implemented. Once implemented, the portable device begins drawing current corresponding to the implemented profile. Sometimes, even after successful implementation of a certain handshake profile, the charging device may not draw sufficient current to charge its battery. Alternatively, the portable device may successfully implement a handshake profile that provides insufficient charging current, even though other profiles available to the charger may have provided more optimum charging current.

Currently no technique exists that can overcome the limitations of selecting an incompatible charger, and not drawing sufficient charging current. It would be advantageous if these problems could be overcome. The present disclosure provides one such technique.

Here, the charger is equipped to sense the current drawn by a portable device. Based on the amount of current drawn, the charger then makes system level decisions, such as resetting the portable device, offering another handshake profile, alerting the portable device or a host, or continuing to charge the device at the current rate. The sensing may be performed after successful completion of a charging profile or at predetermined intervals of time. If the sensed charging current is below a certain threshold value, the charger may reset the portable device and in some instances also alert the portable device or the host about the insufficient charging current. Based on this alert, a user may use another USB port, download a driver, or take any other suitable action.

Exemplary Systems

FIG. 1 illustrates an exemplary battery charging system 100 according to embodiments of the present disclosure. It will be understood that though embodiments of the present invention are described in terms of a USB system, the embodiments of this disclosure are not restricted to USB systems. The embodiments may, just as easily, be incorporated in any other charging system such as a conventional cell phone charger, or a notebook charger, without departing from the scope of the present invention.

The battery charging system 100 includes a portable device 102, a USB connector 104, and a charging circuit 106. The connector 104 attaches the portable device 102 to the charging circuit 106. This circuit 106, in turn, may be connected to a USB Hub or Host 108, such as a computing device.

The USB connector 104 and the charging circuit 106 includes 4 pins, Data (plus) DP 118, Data (minus) DM 120, Voltage VBUS 122, and Ground GND pin 124. Data is transferred to and from the portable device 102 through the data pins. $V_{BUS}$ 122 provides a 5V voltage across the USB port, and GND 124 connects the USB connector 104 to ground. The charging circuit 106 further includes a power switch 110, a high-speed data switch 111, a current sensing module 112, a power supply 113, a comparator 114, and a threshold database 116. The power switch 110 draws current from the power supply 113 and provides the charging current to the portable device 102 through the $V_{BUS}$ 122 pin. The high-speed data switch 111 connects data ports of the portable device 102 to the host 108 through the $D_P$ 118 and $D_M$ 120 pins. The current sensing module 112, connected to the power switch 110, detects the rate at which current is drawn from the power switch 110 once a portable device 102 is connected to the charging circuit 106. The detection may take place when the portable device 102 is connected, or at predetermined intervals without departing from the scope of the present disclosure. The current sensing module 112 is in turn connected to the comparator 114, which compares the detected current with a predefined threshold value. If the sensed current is lower than the threshold, the charging circuit 106 makes certain system-level decisions, such as resetting the portable device 102, or emitting alerting signals. If, on the other hand, the charging current is above the threshold value, the charging circuit 106 may simply carry on charging the portable device 102 without any intervention. The threshold database 116 may store one or more threshold values for the particular port or device type. For example, a BCS 1.1 compatible charging circuit 106 may store typical charging current values for BCS 1.1 compatible portable devices.

The current sensing module 112 may further include circuitry to detect the current. In one embodiment, this module is implemented within the power switch 110 itself. Alternatively, the current sensing module 112 may include circuitry that is not part of the power switch 110, but connected to it. In one example, the sensing module 112 may include an input current amplifier connected to a current sensing resistor, the output of which is connected to an analog to digital converter. It will be understood that any other circuitry or additional circuitry may just as easily be used to detect the current.

The comparator 114 may be implemented in digital or analog. In the digital implementation, the digital value of the current (output from an internal or external ADC) is compared with a digital threshold value. In the analog implementation, a comparator circuit may be connected to the output of the current sensing resistor. In this scenario, the digital threshold value in the database may be converted to analog and applied to the second input of the comparator circuit. It will be understood that the circuit description of both the current sensing module 112 and the comparator 114 are merely exemplary and any other suitable circuit elements may be employed without departing from the scope of the present disclosure.

Figure 2:
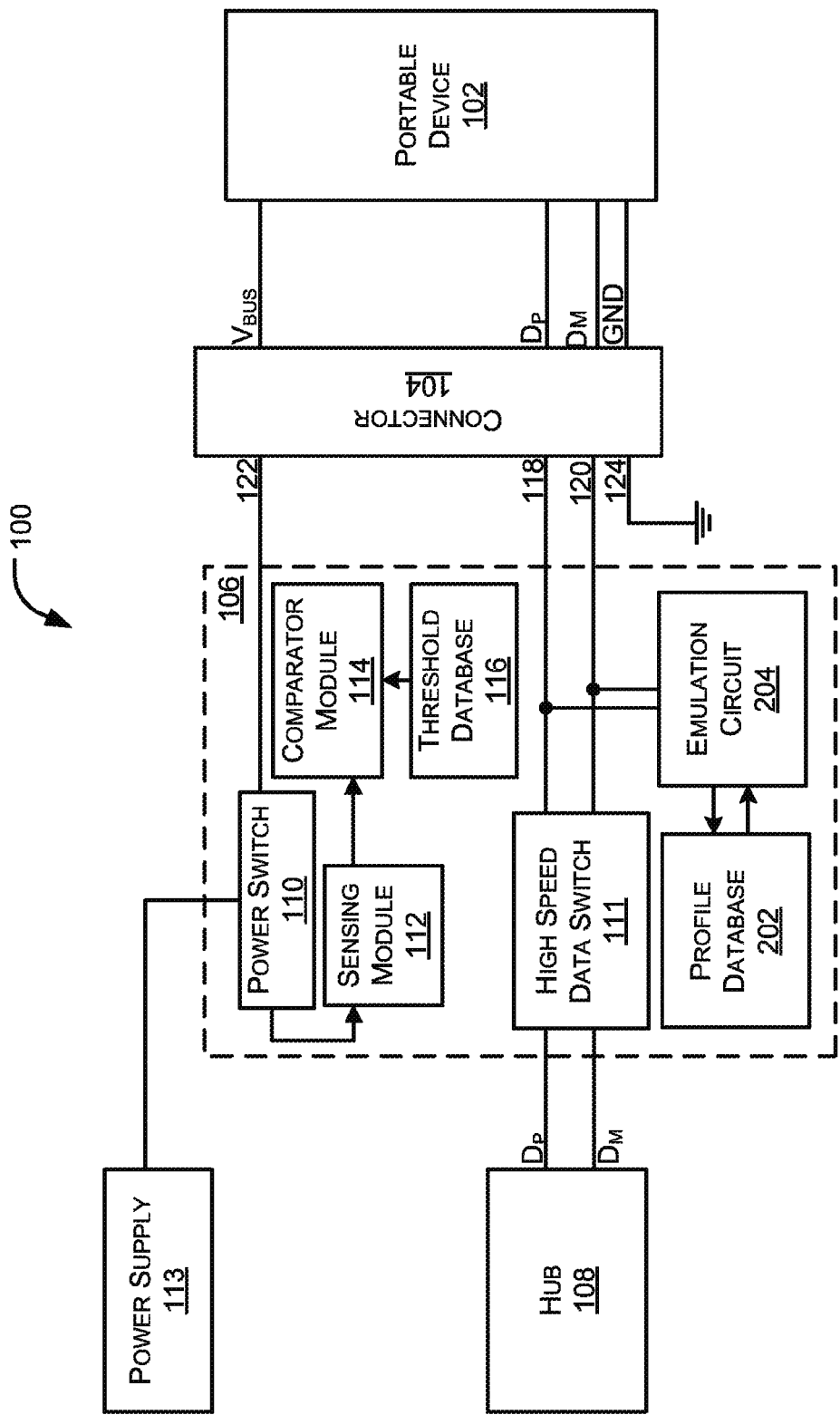
FIG. 2 illustrates an exemplary battery charging system according to another embodiment of the present disclosure.

FIG. 2 illustrates another exemplary embodiment of the present disclosure. Here, the charging circuit 106 may be a universal or smart charger that can efficiently charge a number of portable device types. Here, in addition to the modules previously described, the charging circuit 106 further includes a profile database 202, and an emulation circuit 204. The emulation circuit 204 may attempt to cycle between different profile handshakes until a handshake is successfully implemented. One such smart charging circuit is defined in co-pending U.S. patent application Ser. No. 12/978,371 titled "Method and system for determining an arbitrary charging protocol in USB charging ports." The content of that application is incorporated here in its entirety.

To emulate different charging profile, the profile database 202 maintains multiple charging profiles including the BCS Charging Port Detection Protocol (Charging Downstream Port, Dedicated Charging Port, and Standard Downstream Port), RIM® handshake profile, Apple® handshake profile, and multiple other configurable profiles. For example, the configurable profiles may be utilized to charge certain portable devices that are not compatible with the BCS profile, such as certain handsets manufactured by small entities in China.

Each profile in the database 202 typically includes profile name, profile type, handshake signals used, magnitude of the signals, threshold values, one or more timers, and threshold charging current values. The timers govern the time within which a handshake is expected to be completed. If the portable device 102 does not generate the expected handshake signals in a predefined timeframe, the charging profile is discarded and the portable device 102 is reset.

After attaching a portable device 102 to the charging circuit 106 of a universal charger, the charging circuit 106 powers up and begins cycling through the charging profiles (in a specified order) until a handshake is successfully completed. On successful completion, the sensing module 112 detects the rate of charging current drawn by the portable device 102 by monitoring the power switch 110. If the detected value is below the preset threshold value for that profile, the charging circuit 106 makes one or more system level decisions regarding charging of the portable device. The system level decisions may include discarding the profile, resetting the portable device 102 and moving on to the next charging profile in the database 202; or sending an alert signal to the host 108 or the portable device 102. If at the end of the cycling, a suitable charging profile is not detected, the charging circuit 106 may make any of the following system level decisions: stop cycling through the profiles; stop cycling through the profiles and raise an alert; cycle again through the profiles and accept a charging profile that provides less than optimum charging current; or cycle again through the profiles, accept a charging profile that provides less than optimum charging current, and raise an alert.

The emulation circuit 204 may cycle through the profiles in a predefined order or randomly without departing from the scope of the present disclosure.

Moreover, in the smart charger embodiment, the threshold database 116 may store threshold values for each of the profiles in the profile database 202. Moreover, these threshold values may be stored in a relational fashion with the corresponding profile database 202. For example, the profile database 202 and the threshold database 116 may be part of a relational database.

Exemplary Methods

Figure 3:
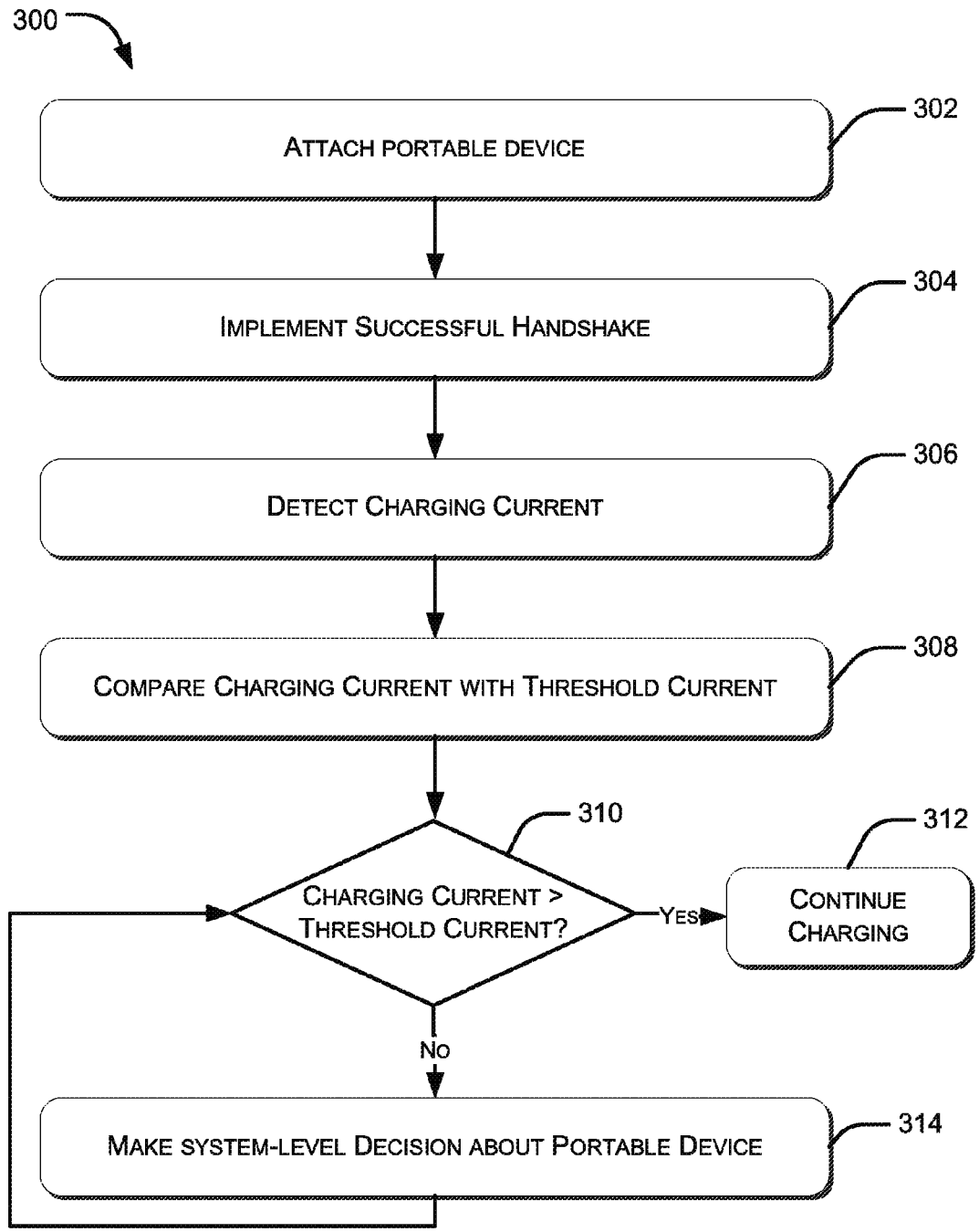
FIG. 3 is a flowchart illustrating an exemplary battery charging method according to embodiments of the present disclosure.

FIG. 3 illustrates an exemplary method 300 for detecting the charging current provided to an arbitrary downstream portable device. The method 300 illustrated in FIG. 3 may be used in conjunction with any of the systems or devices shown in the previously described figure, among other devices. In various embodiments, some of the method elements shown may be performed concurrently, in a different order than shown, or may be omitted. Additional method elements may be performed as desired. As shown, the method 300 may operate as follows.

At step 302, a portable device 102 may be attached to a charging port, such as charging circuit 106. Next, at step 304, the charging circuit 106 may apply a handshake profile to identify the charging circuit port type and to connect the portable device 102 to the charging circuit 106. If the handshake profile is successful, the portable device 102 may begin charging from the power supply 113. Else, charging circuit 106 may generate an alert informing the user that the device has not successfully implemented the handshake profile. In the case of smart chargers, if the portable device 102 does not respond favorably to the handshaking profile, a next profile may be applied. The charging circuit 106 may cycle between all the charging profiles until a profile is successfully completed.

At the next step (306), the current sensing module 112 may detect the current drawn by the portable device 102. In one embodiment, the current sensing module 112 detects the current drawn from the power switch 110. Alternatively, the module 112 may sense the current available on the $V_{BUS}$ 122 pin. As described previously, various current sensing techniques may be utilized here without departing from the scope of the present disclosure. For example, a current sensing resistor may be utilized.

The sensed charging current is compared with a threshold current value at the next step, step 308. The sensed current may be converted into a digital value if a digital comparator is utilized. Otherwise, the stored threshold value may be converted into an analog signal. Then, the analog current signal and the threshold value may be compared in an analog comparator.

At step 310, the charging circuit 106 determines whether the charging current exceeds the threshold current value. If the sensed current is greater than the threshold current (yes path from step 310), the charging circuit 106 may continue charging the portable device 102 and not take any other action, at step 312. If, on the other hand, the sensed current is lower than the threshold value, the charging circuit 106 may raise an alert, disconnect the portable device 102, reset the connection between the portable device 102 and itself, or exit the present handshake profile and attempt a different handshake profile at step 314. These steps increase the efficiency and utility of a charging port by allowing the port to recognize an efficient charging profile or raising an alert in case of inefficient charging.

The methods and systems discussed in the present disclosure provide a mechanism to charge legacy and non-legacy devices using a single emulation circuit 204. The emulation circuit 204 stores multiple charging profiles and includes emulation circuitry to apply and detect multiple responses and stimuli respectively. The emulation circuit 204 cycles through the emulation profiles until the portable device 102 charges optimally.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A battery charging system for detecting charging current supplied to a portable device, the system comprising:
   a charging circuit including:
      a power switch connecting the portable device to a power supply;
      a current detector connected to the power switch for detecting the charging current drawn from the power supply;
      a comparator connected to the current detector for comparing the detected charging current with a threshold current;
      an emulation circuit for performing a handshake protocol;
      a timer for controlling a time window within which the handshake protocol has to complete;
      and wherein the charging circuit is configured to determine whether a selected handshake protocol is completed by the emulation circuit within the time window and wherein the charging circuit is further configured to reset the portable device and discard the selected handshake profile if the handshake protocol has not been completed within the time window and select a new handshake profile.

2. The system of claim 1, wherein if no suitable handshake profile can be implemented, accepting a charging profile that provides less than optimum charging current.

3. The system of claim 1, wherein the charging circuit is further configured, after the handshake protocol has been completed, to make one or more system level decisions regarding charging of the portable device if the detected charging current is below the threshold current,
   wherein the one or more system level decisions comprising: resetting the portable device; offering another handshake profile; alerting the portable device; or continuing charging the portable device.

4. The system of claim 1, wherein the charging circuit further comprising a profile database for storing multiple charging profiles.

5. The system of claim 4, wherein the profile database stores handshake protocols and associated time window values for each charging profile.

6. The system of claim 1 further comprising a power supply coupled to the power switch.

7. The system of claim 1 further comprising a host coupled to the charging circuit and the portable device through one or more data pins.

8. The system of claim 1 wherein the charging circuit is a universal serial port (USB) charging port.

9. A battery charging system for measuring charging current supplied to a portable device and the system comprising:
   a power supply;
   a power switch connecting the power supply to the portable device;
   a current sensing module connected to the power switch for detecting the charging current drawn from the power supply;
   a current threshold database for storing one or more threshold current values;
   a comparator connected to the current sensing module for comparing the detected charging current with a corresponding threshold current value;
   a profile database for storing one or more handshake protocols for connecting the portable device;
   a timer for controlling a time window within which a handshake protocol has to complete; and
   an emulation circuit for:
      applying a handshake protocol to connect the portable device; and
      exiting the handshake protocol if an associated time window has expired, wherein the charging circuit cycles between the handshake profiles until a handshake is successfully implemented, and wherein if no suitable handshake profile can be implemented, accepting a charging profile that provides less than optimum charging current.

10. The system of claim 9, wherein the current sensing module includes at least one of a current amplifier, a current sensing resistor, or an analog to digital signal converter.

11. The system of claim 9, wherein the comparator is a digital module.

12. The system of claim 9, wherein the comparator is an analog circuit.

13. A method for detecting a charging current provided to an arbitrary downstream portable device, the method comprising:
   attaching a portable device to a charging circuit;
   applying a handshake profile within a predetermined time window to identify a charging circuit port type and to connect the portable device to the charging circuit;
   determining whether a handshake profile has been completed within the predetermined time window; making one or more system level decisions regarding charging of the portable device if the handshake protocol has not been completed, wherein the one or more system level decisions comprise: resetting the portable device; offering another handshake profile; alerting the portable device; and continuing charging the portable device.

14. The method of claim 13, wherein if no suitable handshake profile can be implemented, accepting a charging profile that provides less than optimum charging current.

15. The method of claim 13 further comprising after a handshake protocol has been completed, detecting the charging current drawn by the portable device from the charging circuit; comparing the detected charging current with a threshold current value and generating an alert if the charging current is lower than the threshold current value.

16. The method of claim 13, wherein the applying step further comprising: applying a first handshake profile; connecting the portable device to the charging circuit if the first handshake profile is successfully implemented; and applying a second handshake profile in case the first handshake profile is not successfully implemented.

17. The method of claim 15 further comprising exiting a handshake profile if the detected charging current is lower than the threshold current value.

18. The method of claim 15 further comprising applying a second handshake profile if the detected charging current is lower than the threshold current value.

19. The system of claim 3, wherein the charging circuit further comprising a threshold database for storing one or more threshold current values.

20. The battery charging system according to claim 9, wherein after the handshake protocol has been completed and if the detected charging current is lower than the threshold current value, the system is configured to monitor the current with the current sensing module, and the comparator.

* * * * *